No. 781,535. PATENTED JAN. 31, 1905.
E. O. LINTON.
MEASURING APPLIANCE AND COMPRESSOR FOR LIQUIDS.
APPLICATION FILED MAY 16, 1904.
2 SHEETS—SHEET 1.
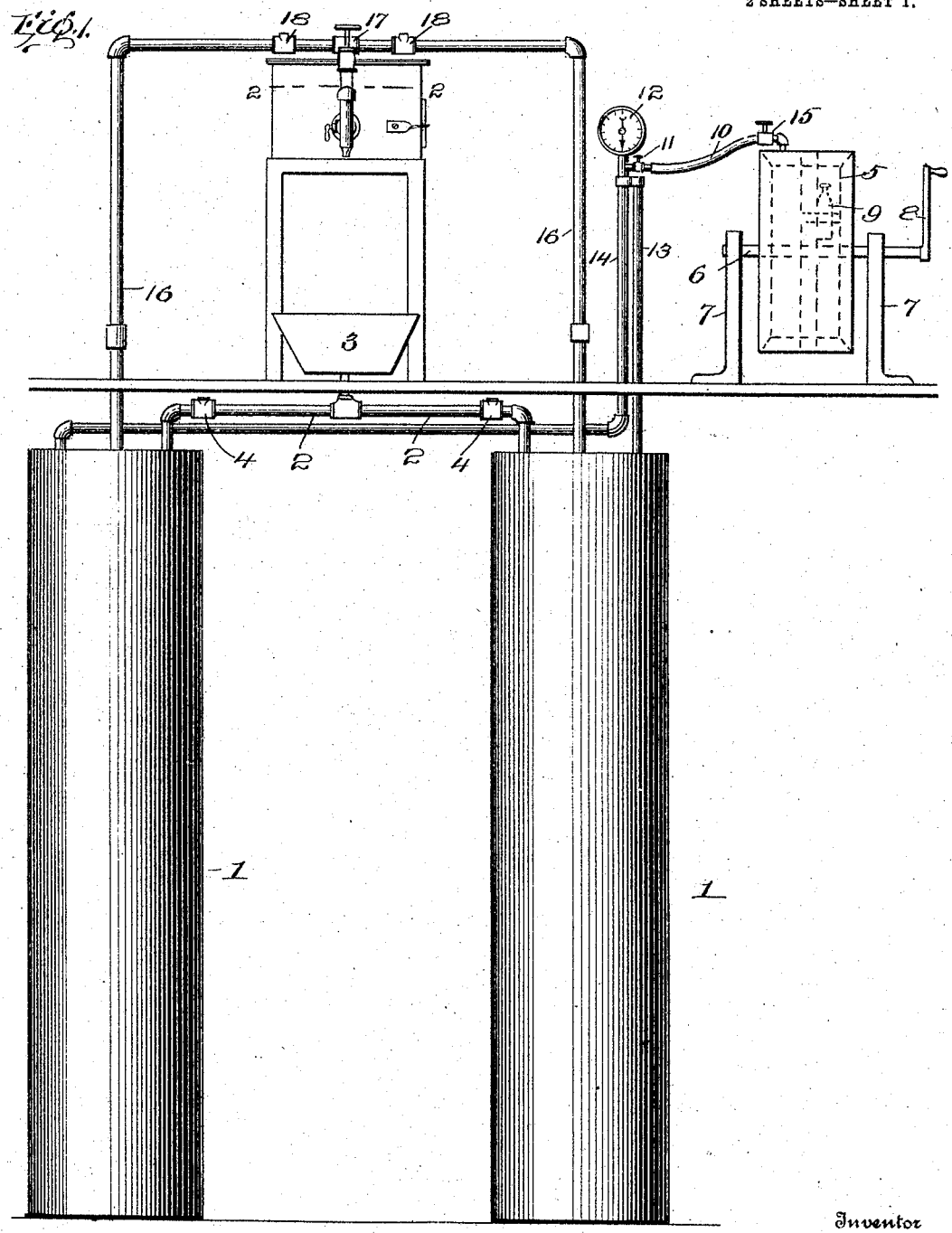

No. 781,535. PATENTED JAN. 31, 1905.
E. O. LINTON.
MEASURING APPLIANCE AND COMPRESSOR FOR LIQUIDS.
APPLICATION FILED MAY 16, 1904.
2 SHEETS—SHEET 2.
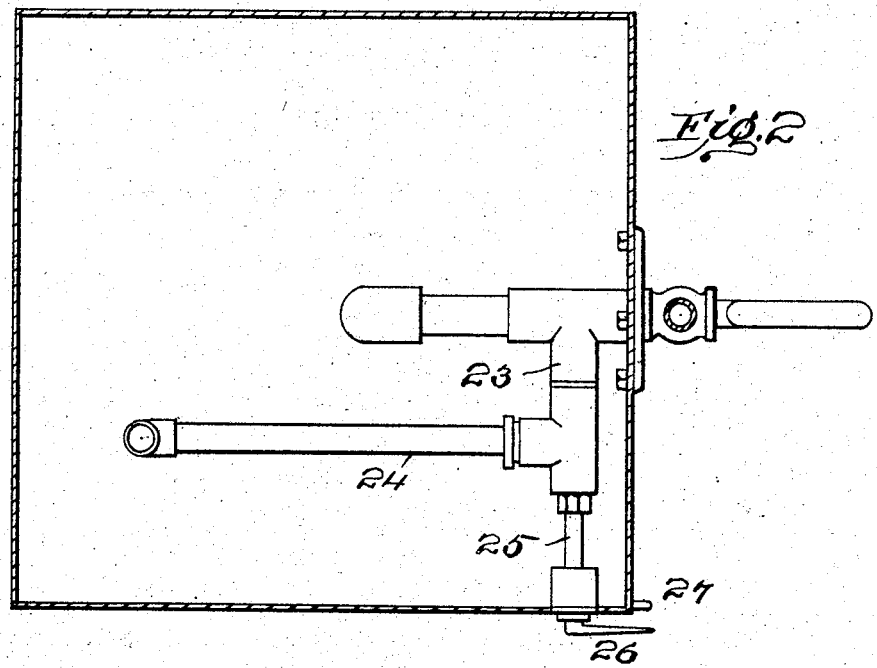
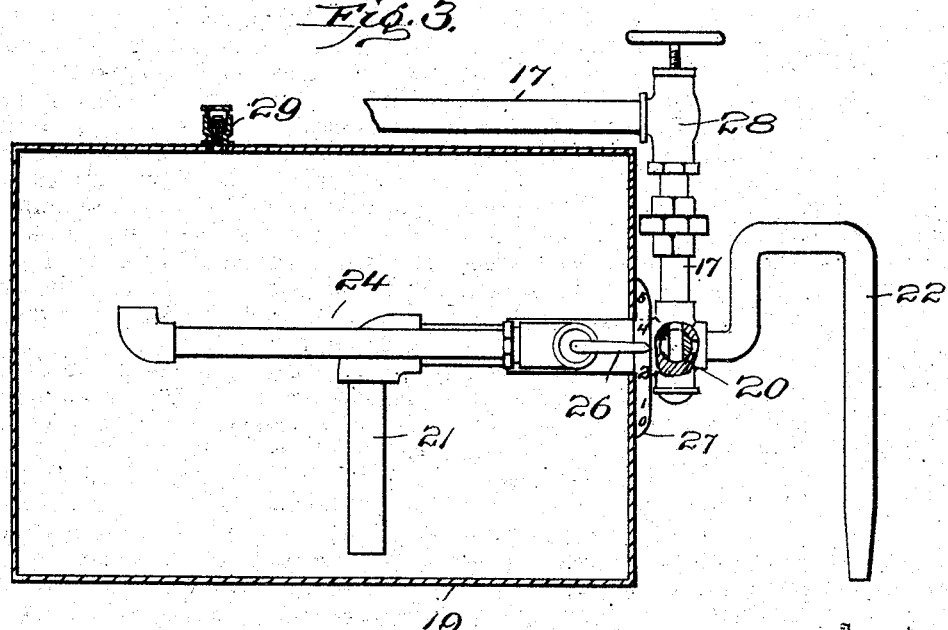

No. 781,535. Patented January 31, 1905.

UNITED STATES PATENT OFFICE.

REISSUED

ERNEST O. LINTON, OF MARION, WISCONSIN, ASSIGNOR OF ONE-HALF TO FRANK LEAKE, OF MARION, WISCONSIN.

MEASURING APPLIANCE AND COMPRESSOR FOR LIQUIDS.

SPECIFICATION forming part of Letters Patent No. 781,535, dated January 31, 1905.

Application filed May 16, 1904. Serial No. 208,259.

*To all whom it may concern:*

Be it known that I, ERNEST O. LINTON, a citizen of the United States, residing at Marion, in the county of Waupaca and State of Wisconsin, have invented new and useful Improvements in Measuring Appliances and Compressors for Liquids, of which the following is a specification.

This invention relates to improvements in apparatus for containing, compressing, and measuring liquids.

Among other objects of the invention is the provision of a receptable for containing liquids under pressure, preferably in the basement of a building, a compressor connected with said receptacle, a measuring apparatus, and means for determining the quantity of liquid discharged from the measuring apparatus.

With this and further objects in view the invention comprises certain novel constructions, combinations, and arrangements of parts, as will be hereinafter fully described and claimed.

In the accompanying drawings, Figure 1 represents a view in side elevation of an apparatus embodying the features of the present invention. Fig. 2 represents a horizontal section taken on the plane of line 2 2 of Fig. 1 and looking downwardly, the parts being shown on an enlarged scale. Fig. 3 represents a vertical section taken centrally through the receptacle shown in Fig. 2, the remaining parts being illustrated in elevation and parts being broken away for disclosing a valve structure.

In carrying out the present invention I contemplate supplying liquid under pressure to a suitable measuring-receptacle, cutting off the supply of liquid, and opening up a siphonic discharge for permitting the discharge of liquid from said receptacle, provision being made for interrupting the siphon at any of a series of graduated points.

In carrying out the invention in a practical form I preferably employ elements such as are illustrated in the accompanying drawings, in which—

1 1 indicate suitable, preferably cylindrical, reservoirs or tanks adapted to be located in the basement or cellar of a building. The tanks 1 are preferably supplied with liquid by means of pipes 2 2, communicating therewith and extending to a suitable funnel 3, and a check-valve 4 is interposed in the length of each pipe 2 for preventing back pressure of the contained liquid and the discharge thereof through the pipes 2. The liquid within the receptacles 1 is subjected to pressure-supply from a suitable carbonator 5, which consists of a tank mounted upon a shaft 6, journaled in supports 7 7 and adapted to be revolved by a crank or other suitable actuating means 8. An acid-cup 9 is arranged within the tank, and a supply of carbonate of soda is arranged therein, so that in operation when the cup 9 is partially inverted and the contents discharged the action of the acid upon the soda will produce gas for supplying the desired pressure to tanks 1 1. The tank constituting the carbonator 5 is arranged to communicate with the tanks 1 1 by a suitable pipe 10, provided with a waste-cock 11 and communicating with a pressure-gage 12. Beneath the pressure-gage 12 the pipe 10 is divided into two branches 13 and 14, communicating with the respective tanks 1 1. A suitable stop-cock 15 is arranged in the pipe 10 for controlling the admission of the gas from the generator 5 to the tanks.

Each of the tanks 1 is provided with a vertical discharge-pipe 16, extending centrally through the respective tanks, preferably to a point near the bottom thereof. The pipes 16 at their upper ends extend horizontally and unite in a suitable pipe 17, a check-valve 18 being arranged in the horizontal portion of each of the pipes 16 for preventing back pressure. A measuring-receptacle 19 is preferably arranged beneath the horizontal portion of the pipes 16 or at any convenient point for receiving the discharge from pipe 17, said pipe preferably communicating with the receptacle 19 about midway of its height through a three-way valve 20, controlling the intake-pipe 21, arranged within the receptacle 19. The pipe 21 has its lower end open at a point preferably contiguous to the bottom of the receptacle 19 for purposes hereinafter mentioned. A siphon-tube 22 is connected with the pipe 21 at the point of juncture of the pipe 17 therewith, the three-way valve 20 being adapted to alternately establish communication between the pipe 17 and pipe 21 and between the siphon-tube 22 and pipe 21, the pipe 17 being closed when communication is established between siphon-tube 22 and pipe 21 and the siphon-tube being closed when communication is established between pipe 17 and pipe 21. A branch pipe 23 communicates with the pipe 21 and extends at an angle thereto and communicates with a measuring-tube 24, revolubly mounted and provided with a supporting-shaft 25, extending through the wall of the receptacle 19 and carrying an indicating-pointer 26, designed to be moved to various points along the length of a graduated scale 27, carried at the edge of the receptacle 19, movement of the pointer 26 effecting a corresponding movement of the pipe 27 in an opposite sense. The measuring-tube 24 is pivoted at that point intermediate the height of the receptacle 19 adapting the free end of said tube to be swung through an arc commencing at the upper surface of the receptacle and ending at the bottom thereof. The pipe 17 is provided with a suitable stop-cock 28, adapted to close communication thereof with the receptacle 19 for purposes hereinafter mentioned. A check-valve 29 is arranged in a tube of the receptacle 19 and preferably consists of a suitable casing and a float-valve adapted to permit of the ready admission or discharge of the atmosphere to or from the receptacle 19, but preventing the discharge of liquid therefrom, contact of the liquid with said float-valve effecting an elevating of said valve and a seating of the same.

In operation liquid is introduced into the tanks 1 1 through the pipes 2 2 by introducing the same into the funnel 3, the stop-cock 15 being closed for preventing an excess of pressure within the tanks 1. When a sufficient quantity of liquid has been introduced into the tank 1, the stop-cock 15 is opened and the pressure admitted to the tanks 1 sufficiently for causing the liquid to rise within the tube 16, and when the valve 28 is opened and the valve 20 properly positioned the liquid will flow into the tank 19, check-valve 29 permitting the discharge of atmosphere from within the tank. As soon as the tank 19 is filled the cock 28 is closed and the pointer 26 is positioned to indicate the desired quantity of liquid to be discharged. The positioning of the pointer 26 positions the tube 24 for causing the immediate starting of the discharge, providing the valve 20 has been positioned for opening communication between pipe 21 and siphon-tube 22. The upper level of the liquid within the receptacle 19 is above the horizontal plane of the highest point of the tube 20, which occasions a starting of the discharge as soon as the valve 20 is properly positioned if the tube 24 is below the cover of the receptacle 19. The liquid continues to flow through the siphon-tube 22 until the level of the liquid within the receptacle 19 drops to the horizontal plane of the free end of the tube 24, whereupon the admission of atmosphere to said tube produces a breaking of the siphonic action. Thus it will be seen that the quantity of liquid discharged will be relative to the particular horizontal plane assumed by the free end of the tube 24, which plane may be varied as desired by variation of the position of the pointer 26.

The inner or discharge end of the pipe 21 is positioned just above the bottom of the receptacle 19 in order that liquid may be supplied through said pipe under pressure, and such pipe will at the same time not affect the siphon action produced through the tube 24. If the pipe 21 were opened above the floor 19 to any great extent, the siphon would be broken as soon as the level of the contained liquid arrived at the opened end of the tube 21 and the efficiency of the action with respect to the tube 24 destroyed.

It is to be noted that in order to effectively accomplish the measuring operation of the contained liquid it is necessary to fill the receptacle 19 completely before each discharging operation.

Having now described my invention, what I claim as new, and desire to secure by Letters Patent, is—

1. In a measuring apparatus, the combination with a receptacle, of an intake-tube extending into the same and discharging near the bottom thereof, a discharge-tube communicating with said intake-tube and having its discharge end approximately below the plane of the liquid to be discharged, valve mechanism controlling said intake and discharge, and a siphon-tube pivoted to said intake-tube in a position for having its free end swung through the arc of a circle extending from the top to the bottom of said receptacle.

2. In a measuring apparatus, the combination with a receptacle, of an intake-tube extending therein and discharging near the bottom thereof, a branch tube extending from said intake-tube, a siphon starting-tube communicating with and pivotally connected to said branch tube, said siphon-tube being adapted to swing upon its pivot through an arc of a circle extending from the top to the bottom of said receptacle, a discharge-tube communicating with the intake-tube and extending to a point below the plane of the liquid to be discharged and a valve mechanism controlling said intake and discharge.

3. In a measuring apparatus, the combination with a receptacle, of an intake-tube extending into the same, a pipe-fitting pivotally connected therewith, a rotatably-mounted shaft fixed to the free end of said pipe-fitting and extending through said receptacle, a siphon starting-tube communicating with said pipe-fitting and designed to be swung vertically when said pipe-fitting is rotated, a discharge-tube communicating with said intake-tube and extending to a point below the plane of the liquid to be discharged and a valve mechanism controlling said intake and discharge.

In testimony whereof I have hereunto set my hand in the presence of two subscribing witnesses.

ERNEST O. LINTON.

Witnesses:
R. SCHROECKERSTEIN,
FRANK LEAKE.